(12) United States Patent
Osborn

(10) Patent No.: US 7,524,261 B1
(45) Date of Patent: *Apr. 28, 2009

(54) INPUT SHAFT-SUPPORTED GEARING

(76) Inventor: Merritt Armstrong Osborn, 101 Royal Oak Dr., Aurora, OH (US) 44202

( * ) Notice: Subject to any disclaimer, the term of this patent is extended or adjusted under 35 U.S.C. 154(b) by 26 days.

This patent is subject to a terminal disclaimer.

(21) Appl. No.: 11/937,122

(22) Filed: Nov. 8, 2007

Related U.S. Application Data

(63) Continuation of application No. 11/423,301, filed on Jun. 9, 2006.

(60) Provisional application No. 60/689,768, filed on Jun. 10, 2005.

(51) Int. Cl.
*F16H 1/36* (2006.01)
(52) U.S. Cl. ...................................... 475/331
(58) Field of Classification Search ................ 475/337
See application file for complete search history.

(56) References Cited

U.S. PATENT DOCUMENTS 6,585,620 B1 * 7/2003 Bae ............................ 475/331

2005/0130794 A1 * 6/2005 Jinbo ......................... 475/331

* cited by examiner

*Primary Examiner*—Sherry L Estremsky
*Assistant Examiner*—Edwin A Young
(74) *Attorney, Agent, or Firm*—Patrick J. Daugherty; Driggs, Hogg, Daugherty & Del Zoppo Co., LPA

(57) ABSTRACT

Gear sets and methods for speed transformation are provided. In one aspect, an input gear is attached to an input motor shaft and a plurality of gear elements comprising an output element cooperatively engage the input gear, wherein a bearing means disposed about the input motor shaft supports the plurality of gear elements upon the motor shaft, the input motor shaft thereby functioning as a torque arm for the plurality of gear elements, the bearing means transferring an operational load comprising a total operative torque load of the gear set to an input motor through the motor shaft. In one aspect the bearing means comprises inner and outer high-speed bearings, and inner and outer disc bodies are disposed about the high-speed bearings and supported by the high-speed bearings. Embodiments include planetary gear and harmonic gear structures, and multistage gear sets.

18 Claims, 12 Drawing Sheets

INPUT SHAFT-SUPPORTED GEARING

REFERENCE TO RELATED APPLICATION

This application is a continuation-in-part of application Ser. No. 11/423,301, filed Jun. 9, 2006, Confirmation No. 5580, which claims the benefit of provisional patent application filed in the United States Patent and Trademark Office on Jun. 10, 2005 by common inventor Merritt A. Osborn, entitled INPUT SHAFT-SUPPORTED COMPOUND GEAR SYSTEM AND METHOD, Ser. No. 60/689,768, Confirmation No. 4567.

BACKGROUND ART

Compound gearing structures, systems and methods are well known in the mechanical arts. A common problem is the need to translate the input speed and/or torque of a motor element input shaft into motive characteristics required for a task at hand. Typically, this requires reducing or increasing the effective speed of a rotating input shaft, and increasing or decreasing its effective torque force properties in a desired application. It is well-known to accomplish these tasks through the use of compound gearing structures, sometimes referred to as gear sets. Other common terms include "gearboxes" and "gear heads", and still others will be apparent to one skilled in the art. Gear sets generally comprise sets of gears, shafts and bearings in an enclosed housing, and are readily available for purchase from a wide variety of manufacturers. They are available in a broad range of sizes, capacities and speed ratios, and a user typically determines the size and performance specifications and chooses or designs the appropriate gear set accordingly.

Conventional gearing arrangements within gear sets include spur, helical, planetary, harmonic, worm, bevel, and cycloidal systems. The physical space requirements and tolerances associated with the application of these conventional gear sets to input motor elements sometimes pose problems. In some applications, space and tolerance dimensions are at a premium, such as, for example, in small robotic or small machine applications. Similarly, weight considerations may indicate the need for a lightweight gear set structure. However, the need to define the gear set compound gearing structure with strong and resilient materials, typically using metal and metal alloy gearing and shaft structures, sometimes in combination with chain, cog belt or "silent chain" structures, requires certain minimum size and spatial dimension accommodations for the gear set as dictated by input and output element speeds and input and output torque specification requirements.

Moreover, the need to physically attach and support the gear set on the input motor structure, and to support the load and torque forces inherent in the operation of the prior art gear set, typically result in dedicated structural support elements that must be designed into the gear set for attachment to the input motor. It is common that these structural support elements result in increasing the material and space requirements associated with the gear set. These additional structural requirements may render some gear sets too large or heavy for small space, tight tolerance and/or low weight specification applications.

What are required are systems and methods that solve the problems discussed above, as well as others.

SUMMARY OF THE INVENTION

In one aspect, gear sets and methods for speed transformation are provided. In one aspect, an input gear attached to an input motor shaft cooperatively engages a plurality of gear elements comprising an output element configured to translate a first motor shaft input gear revolution speed into an output element revolution speed slower than the first motor shaft input gear revolution speed. A bearing means disposed about the input motor shaft supports the plurality of gear elements upon the motor shaft, the input motor shaft thereby functioning as a torque arm for the plurality of gear elements, the bearing means thereby transferring an operational load of the gear set to an input motor through the motor shaft, the operational load comprising a total operative torque load of the gear set. In another aspect, the bearing means comprises inner and outer high-speed bearings, and inner and outer disc bodies are disposed about the high-speed bearings and supported by the input shaft through cooperative engagement with the inner high-speed bearings.

In one aspect, the plurality of gear elements comprises a plurality of planetary gears rotating on planetary gear pins and circumferentially spaced about the input gear and disposed between the inner and outer disc bodies, the planetary gears engaging the input gear, and a ring gear disposed about and engaging the planetary gears. The output element is disposed about the input shaft and configured to freely rotate about the input shaft, the output element urged to move through a cooperative engagement with at least one of the outer pin end plurality and the outer disc, the ring gear affixed to the input motor housing.

In one example, the gear set is generally cylindrical with respect to the input motor shaft, the gear set having a width dimension of about 1.06 inches and an outer radius dimension of about a 6.6 inches, and the input motor shaft has an outside diameter of about 5/8 inch and an input shaft length of about 2 and 1/16 inches, the input motor shaft further defining a keyway dimension of about 3/16 inch.

In another aspect, the output element cooperative engagement comprises a second stage plurality of planetary gears, a second stage planetary gear pin plurality, and second stage outer and inner disc bodies, wherein at least one of the second stage outer pin end plurality and the second stage outer disc rotate the output element at a second stage output speed, the second stage speed slower than a first stage rotation speed of the outer disc or the ring gear.

In another aspect, the inner and outer disc bodies engage harmonic gears. In another aspect, the ring gear comprises at least one roller chain, and the plurality of planetary gear teeth engaging elements are chain rollers. In another aspect, the output element further comprises an output element aperture defined about the input shaft, and an output element bearing means disposed within the aperture supports the output element upon the input shaft. And in another aspect, an output element shaft extension defines an inner shaft cylindrical aperture disposed to freely rotate about the input shaft, wherein a support bracket attached to the motor housing and defining a bracket aperture disposed about the output element shaft extension comprises a shaft support bearing means rotatably connecting the output element shaft extension to the support bracket; the output element is supported by the shaft support bearing means and the high-speed bearing means.

Still further advantages of the present invention will be appreciated by those of ordinary skill in the art upon reading and understand the following detailed description. The invention may take form in various components and arrangements of components, and in various steps and arrangements of steps. The drawings are only for purposes of illustrating the preferred embodiments and are not to be construed as limiting the invention.

DESCRIPTION OF THE PREFERRED EMBODIMENTS

The present invention teaches a system and method for designing compound gear sets wherein the load, and optionally torque, of a gear set is supported upon the input motor shaft through bearing structures. The invention may be practiced with many types of gearing systems, including spur, helical, planetary, harmonic, worm, bevel, and cycloidal gearing. In one advantage gearing may be provided wherein no separate torque arm or support structure is required, resulting in greatly improved efficiencies in space and material.

Figure 1:
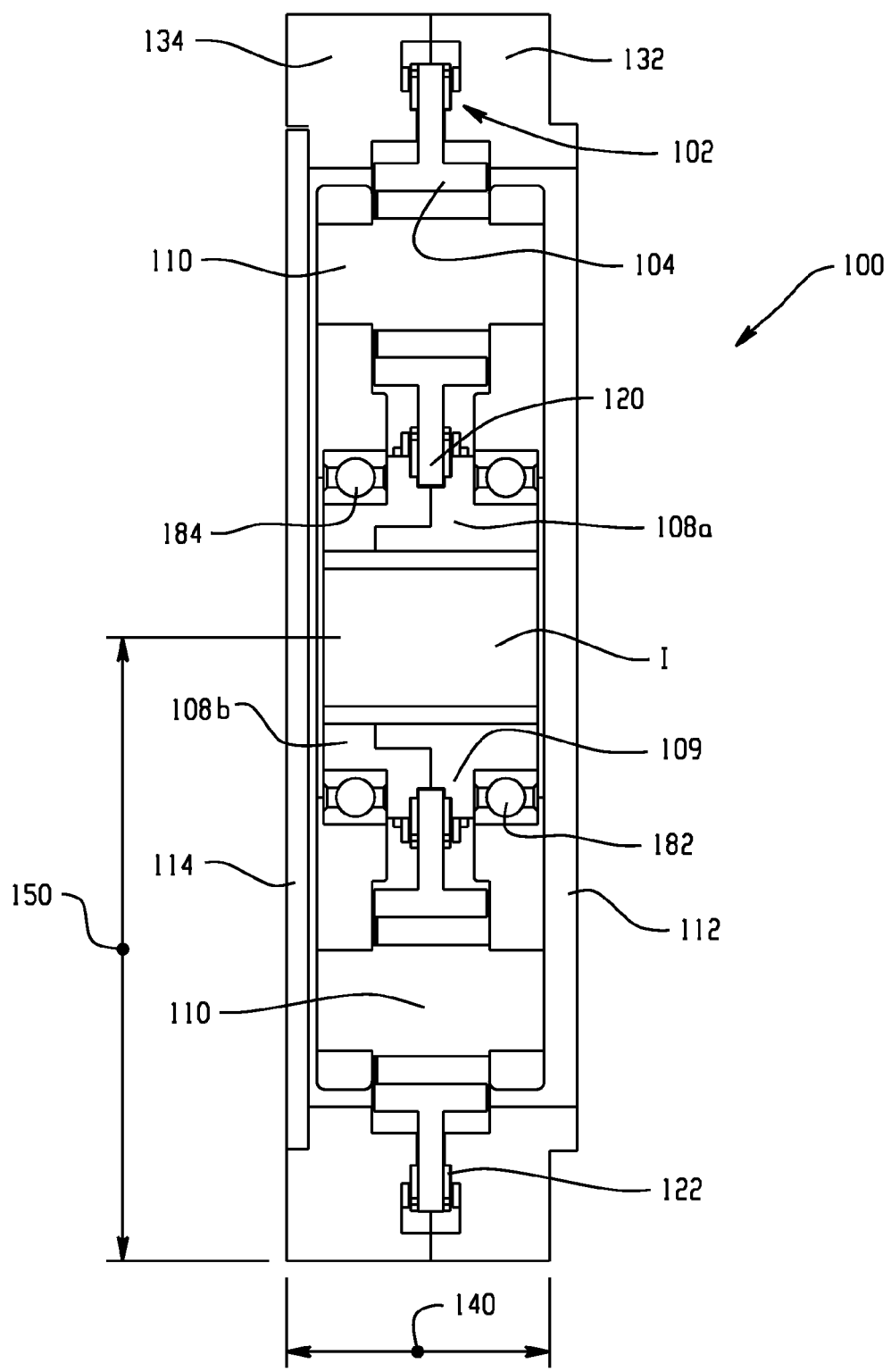
FIG. 1 is a sectional view of a gear set utilizing a gear system and method according to the present invention.
Figure 2:
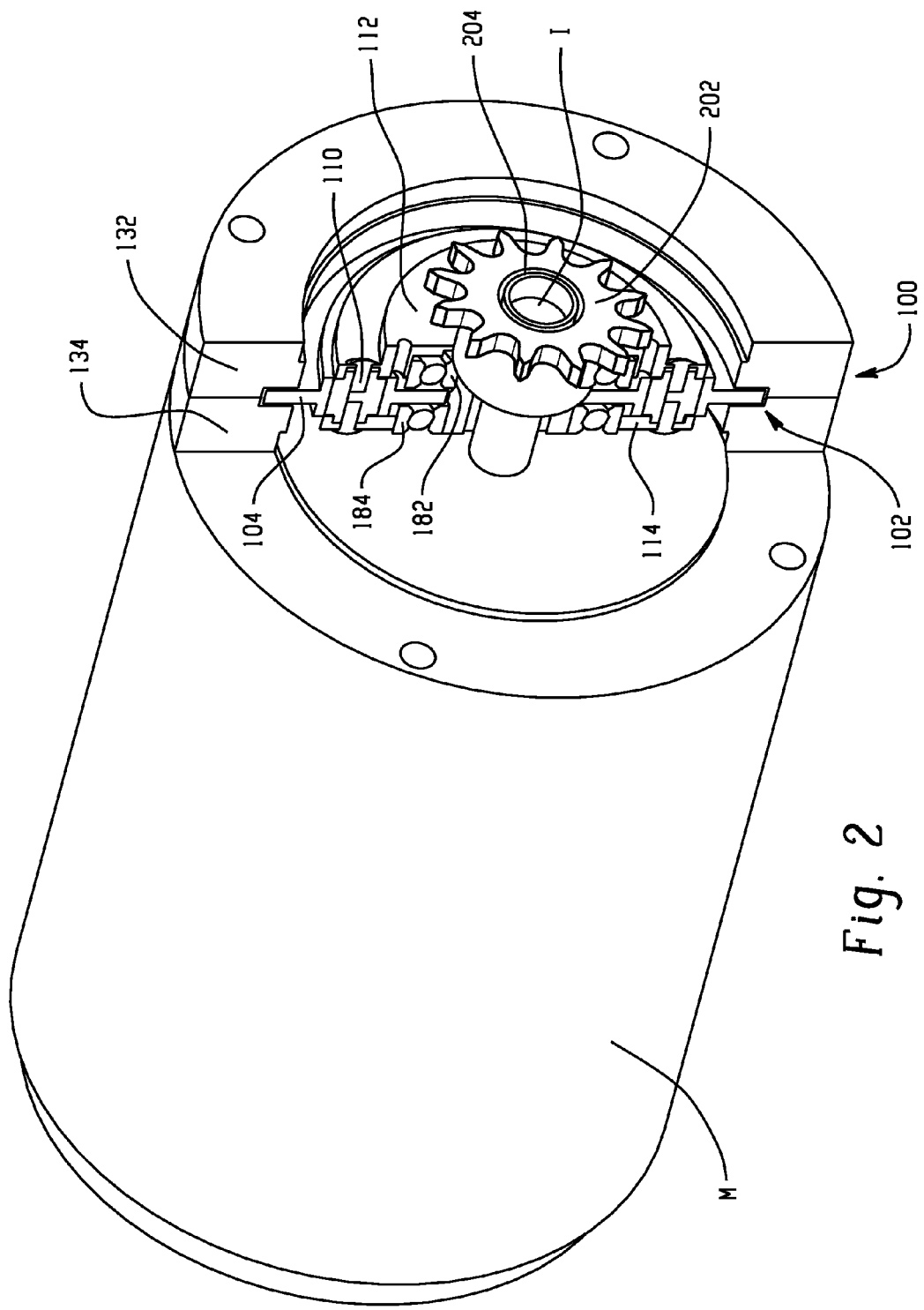
FIG. 2 is a perspective and sectional view of the gear system of FIG. 1 shown as attached to an input motor.

Referring now to FIGS. 1 and 2, a cross sectional view of a planetary gear set gearing system 100 according to the present invention connected to an input motor M is illustrated. For an understanding of the structure of the present embodiment, the reader is referred generally to planetary gear systems taught by other commonly-assigned patent applications, wherein the present inventor is a co-inventor, specifically U.S. Provisional Patent Application of Merritt Armstrong Osborn and Theodore Radisek entitled COMPOUND GEARING SYSTEM AND METHOD WITH CHAIN FLAT SEAT STRUCTURES, Ser. No. 60/441,011, filed Aug. 12, 2004, Confirmation No. 1104; and a co-pending U.S. utility patent application claiming priority of said provisional application Ser. No. 11/202,876, filed Aug. 12, 2005, Confirmation No. 9280. However, it is to be understood that other planetary compound gearing gear set structures and applications may be practiced with the present invention and the specific type of gearing in the gear set is not important.

As illustrated in FIGS. 1 and 2, a roller chain component 109 is reeved onto and connected thereby to a compound sun input driving gear 108 comprising inner 108b and outer 108a members, the sun gear 108 attached to an input motor shaft 107 driving four circumferentially spaced planetary gears 104 through interaction with their gear teeth 120. Exemplary roller chain-sun gear 109/108 configurations are described in the aforementioned U.S. utility patent application Ser. No. 11/202,876: alternative sun gear structures utilized solid gear elements such as gear teeth, roller pins and rounded-tooth elements may also be used for the sun gear 108, including examples of each as also provided in said U.S. utility patent application Ser. No. 11/202,876. Each of the planetary gears 104 rotates about one of four circumferentially spaced pins 110, the pins fixed into an outer output disc body 112 and an inner output disc body 114. As the planetary gears 104 are rotated by the driving gear 108, they responsively travel along an inner ring gear 102 formed by a single strand precision roller chain through interaction of the gear teeth 120 with the chain strand rollers 122, the chain ring gear 102 affixed between an outer annular disc 132 and an inner annular disc 134.

As the ring gear 102 is fixed in position relative to the outer annular disc 132 and an inner annular disc 134, rotation of the input sun gear 108 will cause one of two operational reactions. In the first operational reaction, where either the outer annular disc 132 and/or inner annular disc 134 are fixed into a static position with respect to the input motor M, rotation of the input sun gear 108 will cause traveling of the planetary gear teeth 120 along the chain rollers 122 and responsively cause the planetary gears 104 and their pins 110 to "orbit" about the central "sun" driver 108. The orbit of the pins 110 about the driver 108 thereby drives the disc bodies 112 and 114 at a reduced speed and increased torque relative to the input driving gear 108. The reduced speed and increased torque are conveyed through an output element 202 attached to the second outer disc body 112. In the present embodiment the output element 202 is a gear 202, which may engage another gear element to produce the desired output torque and speed transformation, as is well known to one skilled in the art.

The output element 202 freely rotates about the input shaft I through a central aperture 206 formed in the output element 202. Optionally, a bearing element 204 may be provided within the aperture 206 to provide cooperative movement and/or alignment functions for the output element 202 with respect to the input shaft I; however, this is not required to practice the present invention.

In an alternative second operational reaction, the disc bodies 112 and/or 114 are instead fixed into a static position with respect to the input motor M. Rotation of the input sun gear 108 causes traveling of the planetary gear teeth 120 along the chain rollers 122 and, as the pins 110 are correspondingly fixed into a static position with respect to the input motor M, the rotation of the planetary gears 104 responsively drives the outer ring gear 102 and the outer annular disc 132 and inner annular disc 134 affixed thereto into an "orbital" motion about the central "sun" driver 108 at a reduced speed and increased torque relative to the input driving gear 108. The reduced speed and increased torque may be conveyed through an output element structure (not shown) attached to either or both of the inner annular disc 134 and outer annular disc 132, which may, therefore, engage another gear element to produce the desired output torque and speed transformation, as will be readily apparent in one skilled in the art. Also, it will also be apparent that the input and output functions can be reversed, thereby providing speed increase and torque decrease functions by the gear set 100.

As is also readily apparent to one familiar with planetary gearing, alternative output torque forces and output speeds may be correspondingly selected through the selection of affixing an output element to either the inner annular disc 134 or outer annular disc 132, in contrast to affixing an output element to either of the disc bodies 112 and 114, for the same input speed and torque as conveyed by the input shaft I. More specifically, the same input speed and torque will produce a faster rotational output speed and lower output torque when the output element 202 is attached to the outer disc body 112, and the outer annular disc 132 and inner annular disc 134 are fixed into a static position relative to the input motor M, than where another output element (not shown) is attached to the outer annular disc 132 and/or inner annular disc 134 and the outer disc body 112 and inner disc body 114 are fixed into a static position relative to the input motor M.

In the present invention the input shaft I supports the gear set 100 and receives a transfer of power and load from the gear set 100 to the input motor itself through the input motor shaft; it may also function as a torque arm for the gear set assembly 100. This is accomplished by the attachment of the sun driver gear 108 directly to the input shaft I, and by support of the inner output disc body 114 and the outer output disc body 112 by the input shaft I through a bearing means. In the present embodiment, the bearing means comprises two high-speed bearings 182 and 184, wherein the inner output disc body 114 is supported by a first inner bearing 184, and the outer output disc body 112 is supported by a second outer bearing 182. The sun driver gear 108 and bearings 182 and 184 thereby function to transfer torque, load and support forces from the gear set 100 directly to the input shaft I.

Another advantage of the present invention is that, by utilizing a bearing means directly connected to the input shaft for these force transfer functions, the need for additional torque arm or support structures is eliminated, allowing the entire gear set assembly 100 to be designed within a narrow width dimension 140, enabling embodiments of the present invention to be utilized for gearing applications that other prior art gear set assemblies are foreclosed from due to much wider footprints and space requirements. In one embodiment of the present invention, the width dimension 140 is about 1.06 inches; thus, the present invention enables speed transformation applications on very short motor shaft lengths. In one exemplary application for a motor shaft I with a ⅝ inch outside diameter, a 3/16 inch keyway and a 2 and 1/16 inches shaft length, the gear set 100 is interfaced with the input motor and shaft I through a NEMA 56-C mounting and performs a 4-to-1 speed reduction on an anticipated 1750 RPM input from the input shaft I, wherein the gear set 100 has a 6.6 inch outside radius dimension 150, a housing width dimension 140 of about 1.06 inches, and an output element gear 202 width dimension of about 1.0 inch.

Another advantage illustrated by the present embodiment 100 is the use of the roller chain for the outer ring gear 102 enables the gear set 100 to be an "uncased" gearhead assembly, since the roller chain may be impregnated with its own lubricant as is well known in the art. This removes the requirement to encase the gearhead assembly 100 in order to contain lubricants, such as gear oils, which allows for substantial reduction in the cost of manufacturing the gear set 100, resulting in greatly increased production efficiencies over prior art gear sets.

Figure 3:
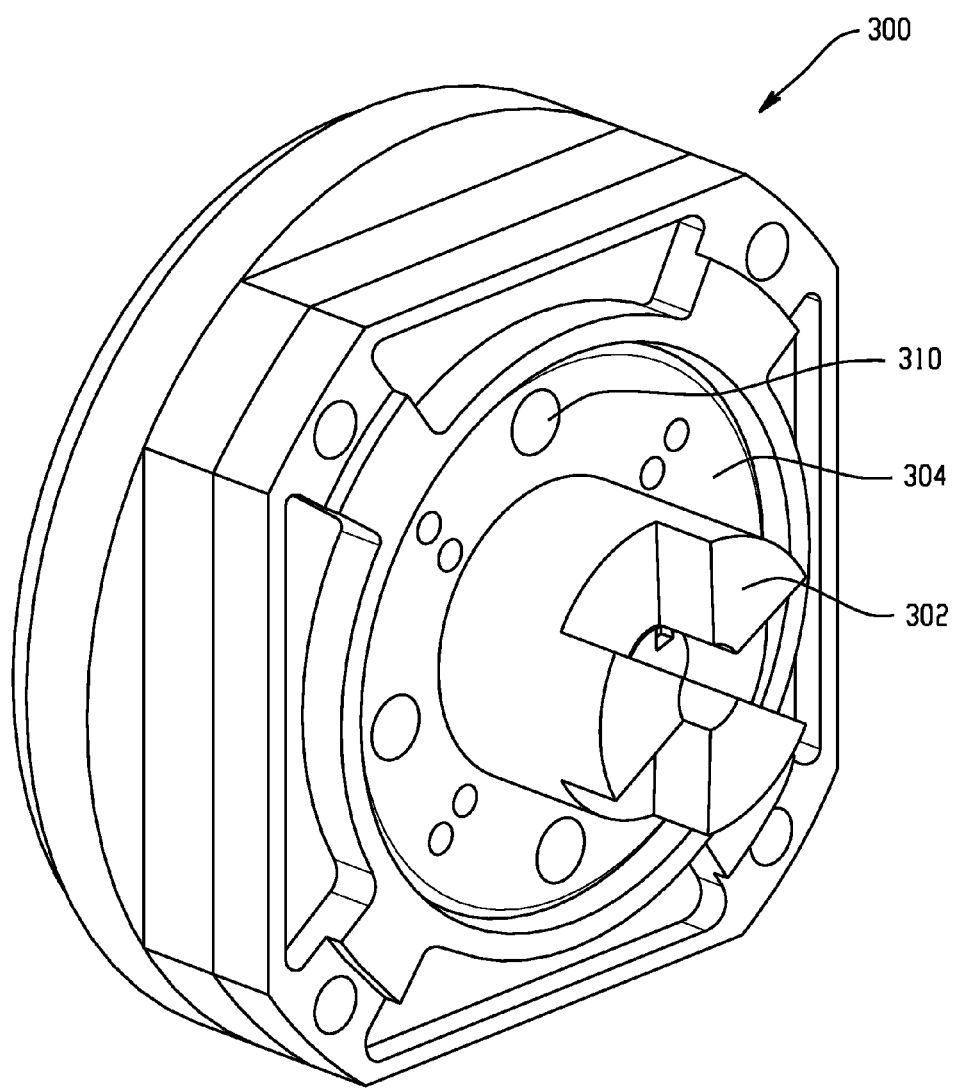
FIG. 3 is a perspective view of another embodiment of the present invention.

FIG. 3 illustrates an embodiment of the present invention 300 wherein the output element is a Lovejoy coupling 302 affixed to an outer disc body 304 driven by four planetary gear pins 310 in a similar fashion as the embodiment 100 described above. As is well known to those skilled in the art, the Lovejoy coupling 302 enables additional efficiencies in forming output torque and speed transformation connections.

Figure 4:
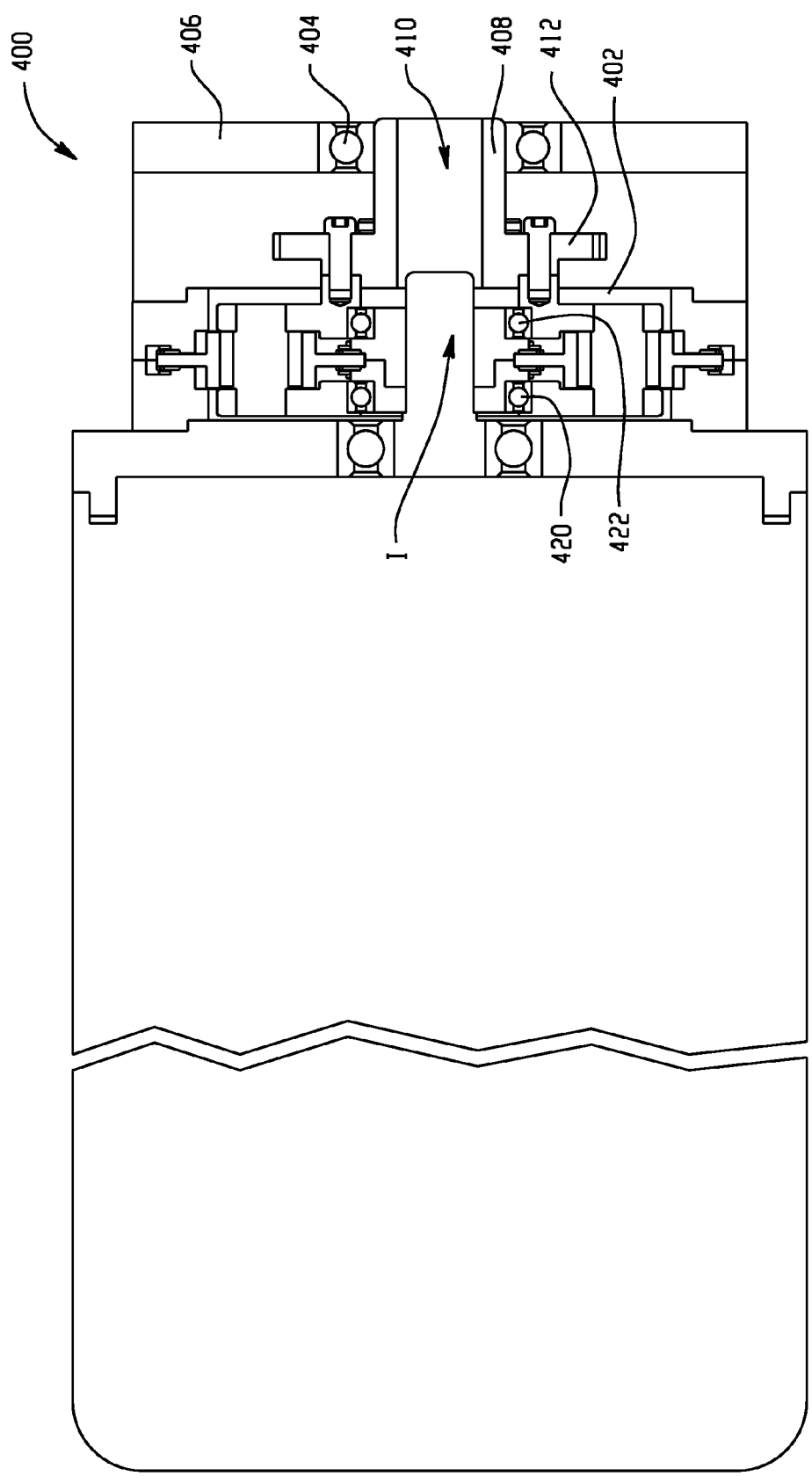
FIG. 4 is a perspective and sectional view of another embodiment of the present invention shown as attached to an input motor.

FIG. 4 illustrates another embodiment of the present invention 400, wherein a planetary gear set assembly similar to that taught by embodiment 100 further comprises a support bracket 406 attached into the gear set 400. The support bracket 406 comprises a low-speed support bearing 404 that is disposed about a hollow output shaft extension 408 extending from the outer disc body 402, the shaft extension 408 defining an inner cylindrical aperture 410 formed to freely rotate about the input shaft I. This enables the output element 412 to accommodate an overhung load or a side load. Wherein it is well known in the prior art to support gear set output shafts subject to overhung or side loads with two or more low-speed output bearings, the present invention enables supporting the output element gear member 408 with only one low-speed bearing 404 at one end, and rely upon the two internal high-speed bearings 420 and 422 to provide support at the other end, thereby providing superior efficiencies in materials and space requirements.

Alternatively, the overhung or side load may be removed, and the shaft extension 408 supported by the third support bearing 404 may enable the formation of a regular gearbox, wherein the output shaft is supported by the third support bearing 404 and also through the gear set assembly 400 by the two high-speed bearings 420 and 422 riding directly on the input shaft I.

Figure 5:
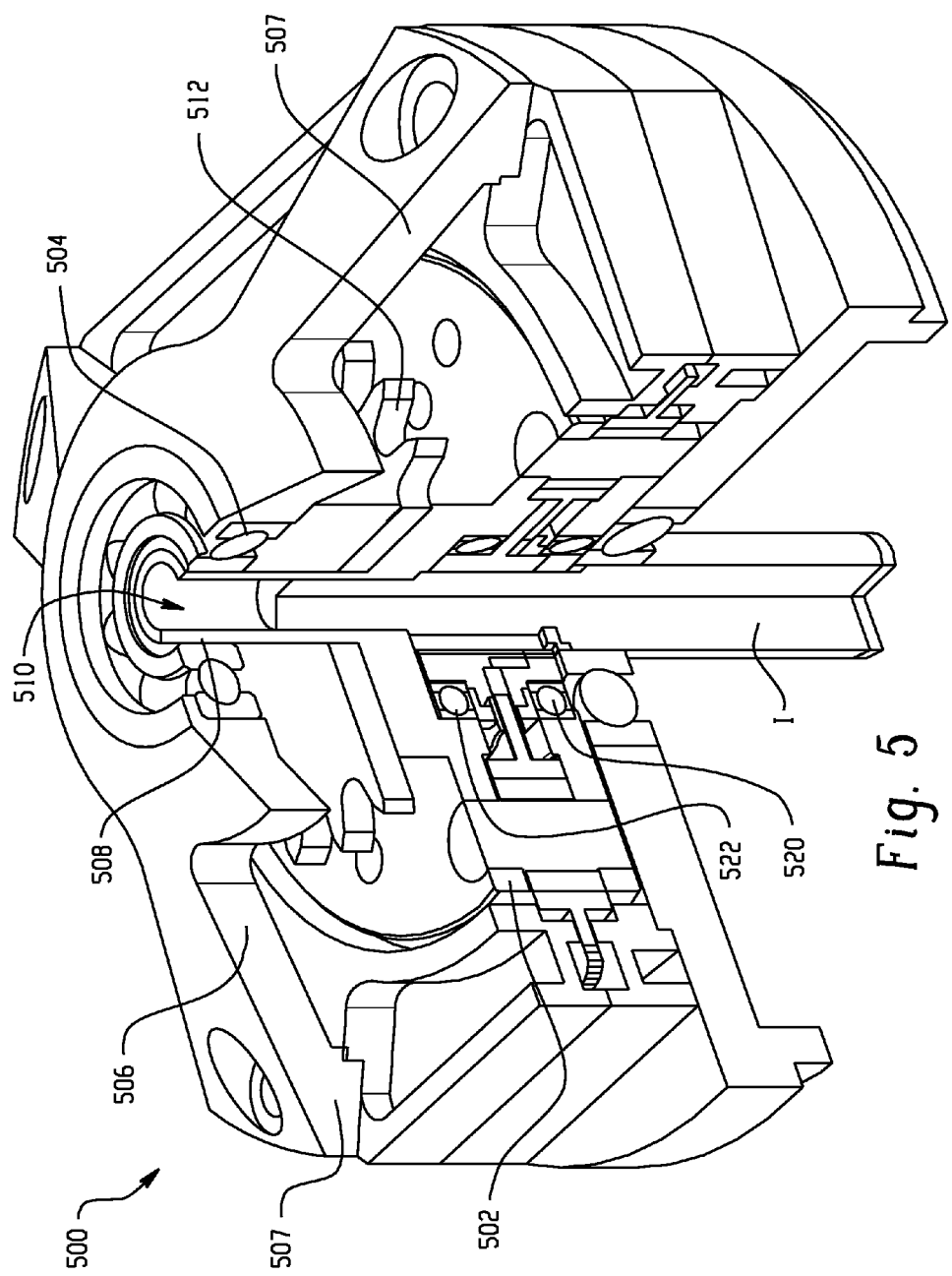
FIG. 5 is a perspective and sectional view of another embodiment of the present invention.

FIG. 5 illustrates another embodiment of the present invention 500 comprising a support bracket 506. The support bracket 506 comprises two or more supporting arms 507 that encompass a support bearing 504 disposed about a solid output shaft extension 508 extending from an outer disc body 502, the shaft extension 508 extending beyond an inner cylindrical aperture 510 formed to freely rotate about the input shaft I. This enables the output element gear 512 to accommodate an overhung load or a side load, as will be readily apparent to one skilled in the art. It will also be readily apparent to one skilled in the art that more than two support arms 507 may be provided, or that the support bracket 506 may be formed by a solid conical structure (not shown), thereby sealing or entirely covering the gear set 500, and serving to support the output shaft for some other type of connection external to the body of the gear set 500.

As will also be readily apparent in one skilled in the art, the present invention may be adapted to gear set speed reducers and/or increasers that provide multiple stage speed and/or torque transformation properties. For example, referring now to FIG. 6, a two-stage speed reducer gear set 600 is illustrated. In the first stage, stage one planetary gears 602 and their associated planetary gear pins 604 compel the orbit of inner disc body 612 and outer disc body 614 at a reduced speed and increased torque relative to the input driving gear 608. The orbiting motion of the inner disc body 612 is responsively translated by second-stage planetary gears 620 and their associated planetary gear pins 622 through interaction with the outer ring gear 630 into a second stage reduction of speed and increase of torque, as generated by the responsive rotation of the output shaft 632 connected to the second stage planetary gear pins 622. In one example of the two-stage speed reducer 600, a 30-to-1 speed reduction can be achieved. It will also be apparent that the input and output functions can be reversed, thereby providing speed increase and torque decrease functions by the gear set 600.

Figure 6:
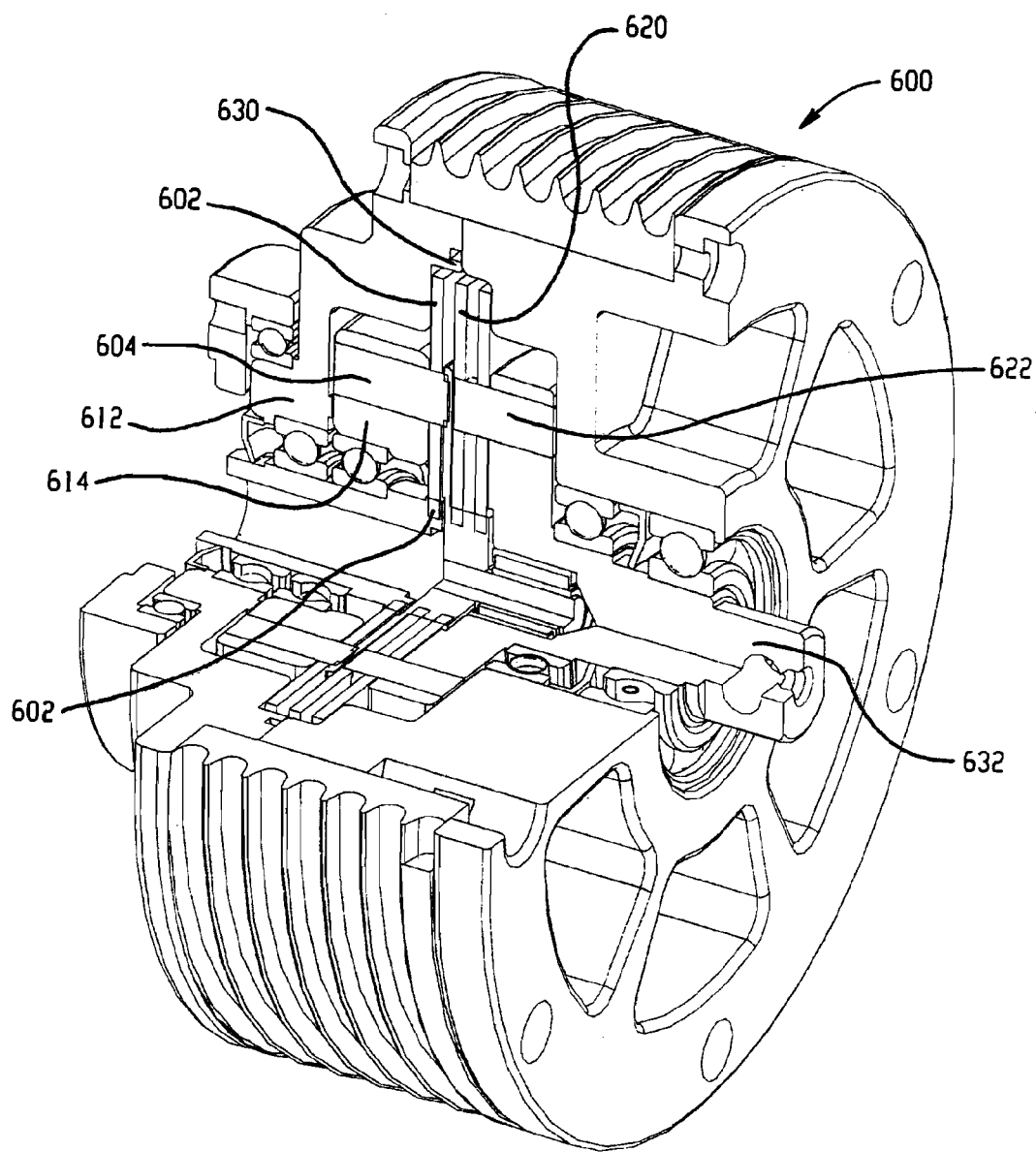
FIG. 6 is a perspective and sectional view of another embodiment of the present invention.
Figure 7:
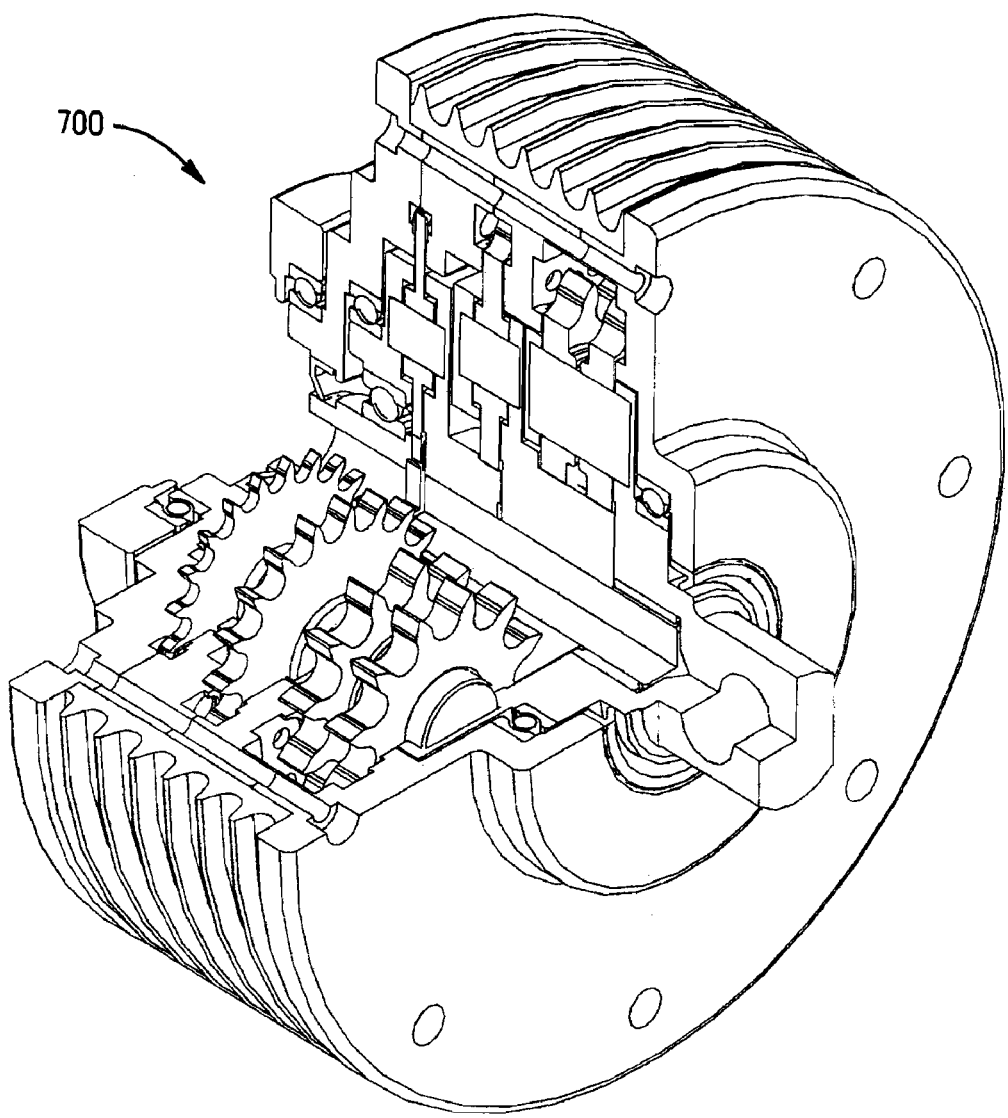
FIG. 7 is a perspective and sectional view of another embodiment of the present invention.

FIG. 7 provides a stylized representation of a three-stage planetary speed reducer gear set 700 that extends the concept of the embodiment 600 of FIG. 6 into a third stage of speed reduction and torque increase. The concept of three-stage planetary gear speed reducers is well known, and it is not believed necessary to describe the function of a three-stage planetary gear speed reducer with particularity as the concept is well understood by one skilled in the art. In one example of the three-stage speed reducer 800, a 650-to-1 speed reduction can be achieved in an efficient and cost-effective manner. Again, it will also be apparent that the input and output functions can be reversed, thereby providing speed increase and torque decrease functions by the gear set 700.

Figure 8:
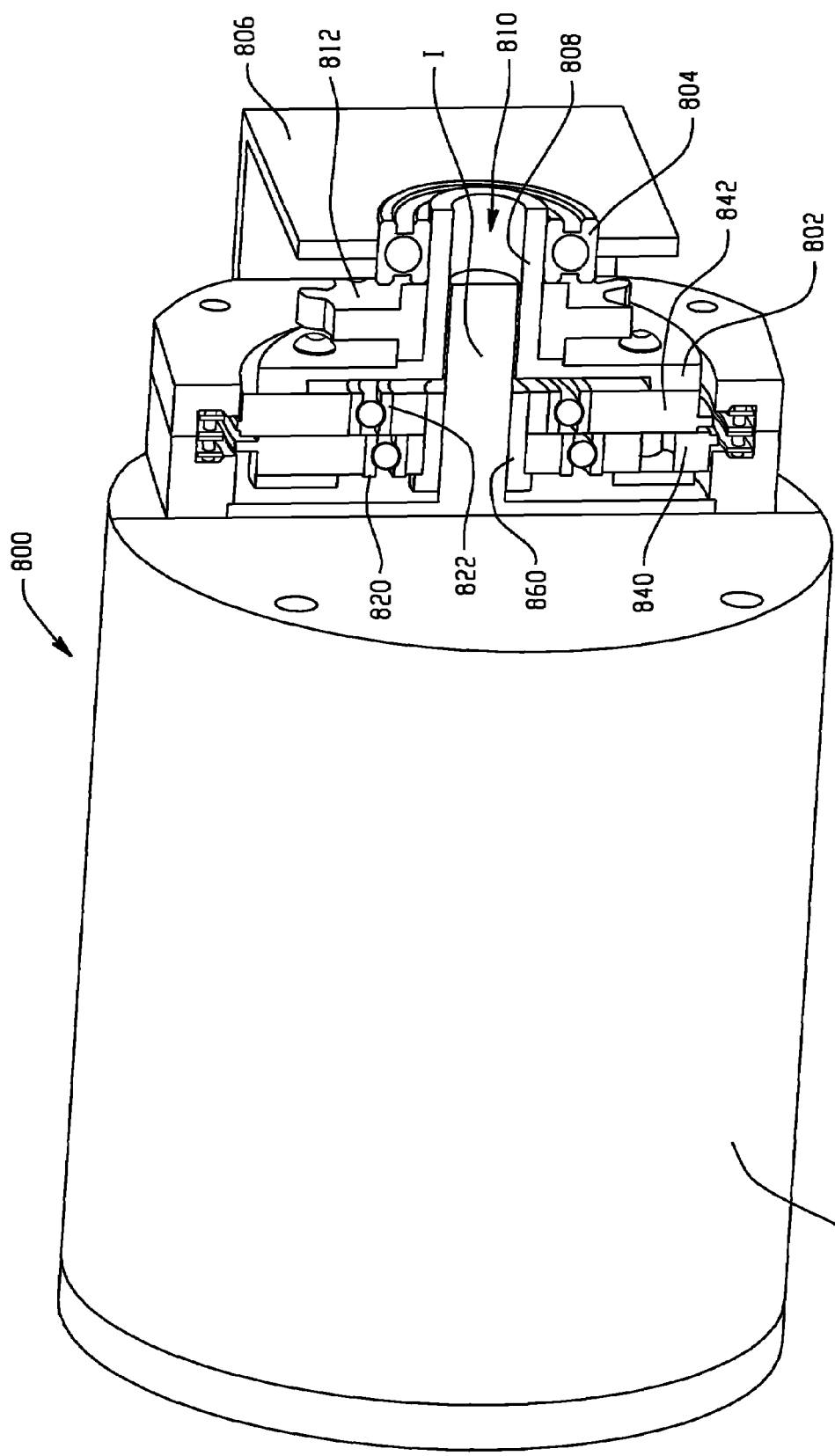
FIG. 8 is a perspective and sectional view of another embodiment of the present invention shown as attached to an input motor.

FIG. 8 illustrates a harmonic gear set 800 according to the present invention. The principles of a harmonic compound gearing in gear set configurations are well known to one skilled in the art; one example is taught in U.S. Pat. No. 4,640,154 issued to the present inventor, Merritt Osborn, on Feb. 3, 1987 and entitled "Epicyclic Power Transmission," although other harmonic gear configurations may be practiced with the present invention. Accordingly, a detailed description of the workings of the harmonic gear set 800 in providing speed transformation and torque increase functions is not believed to be required. The present invention supports the first harmonic gear 840 by the high-speed motor shaft I through a first high-speed bearing 820 located about the input harmonic gear element 860 attached to the motor shaft I, and the second harmonic gear 842 by the high-speed motor shaft I through a second high-speed bearing 822 located about the input harmonic gear element 860.

In a fashion similar to the planetary gear set embodiment 400, the harmonic gear set 800 also supports an optional support bracket 806 attached onto the gear set 800. The support bracket 806 comprises a support bearing 804 that is disposed about a hollow output shaft extension 808 extending from the outer disc body 802, the shaft extension 808 defining an inner cylindrical aperture 810 formed to freely rotate about the input shaft I. This enables the output element gear 812 to accommodate an overhung load or a side load, as will be readily apparent in one skilled in the art.

Figure 9:
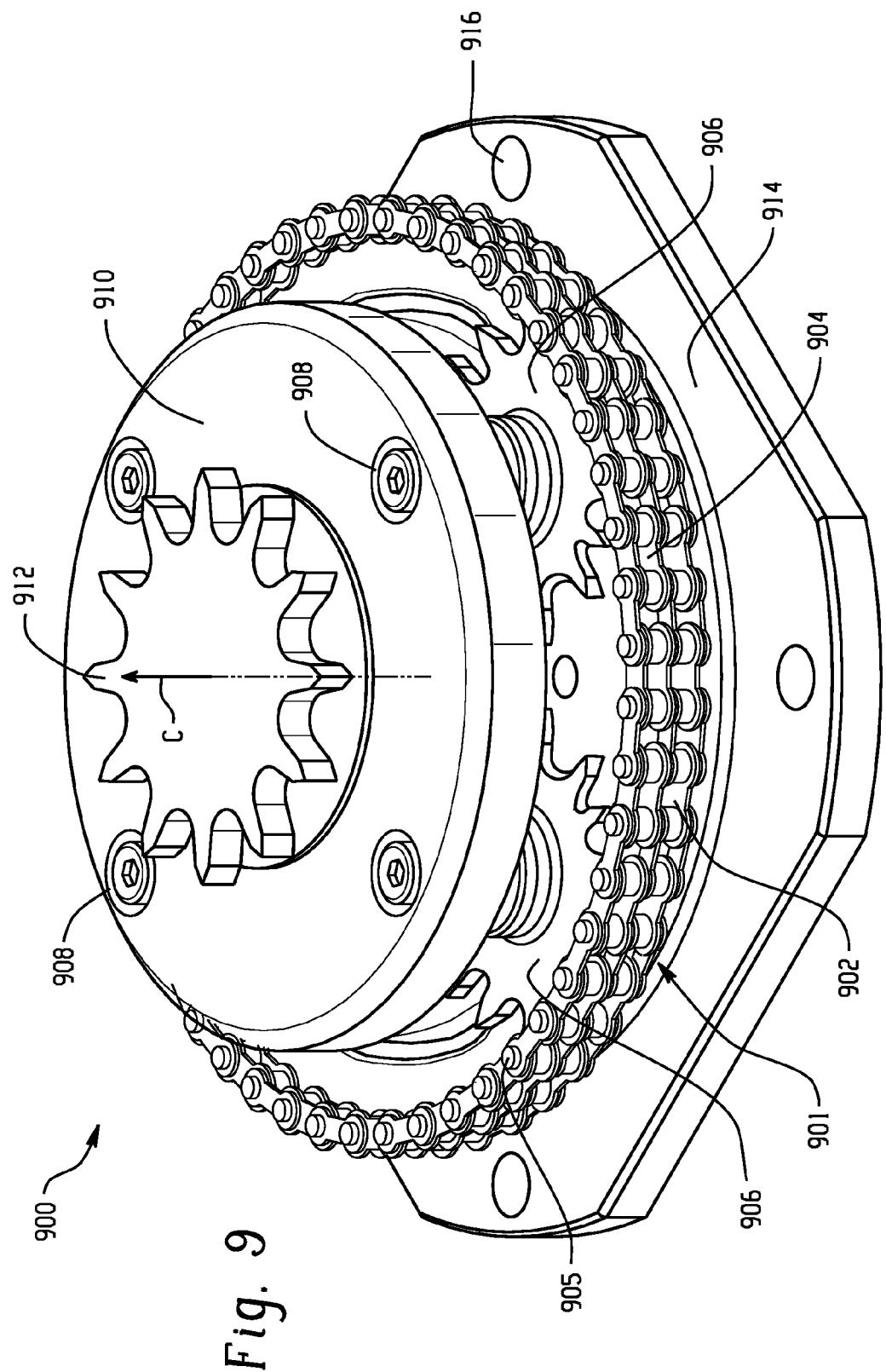
FIG. 9 is a perspective view of another embodiment of the present invention.
Figure 10:
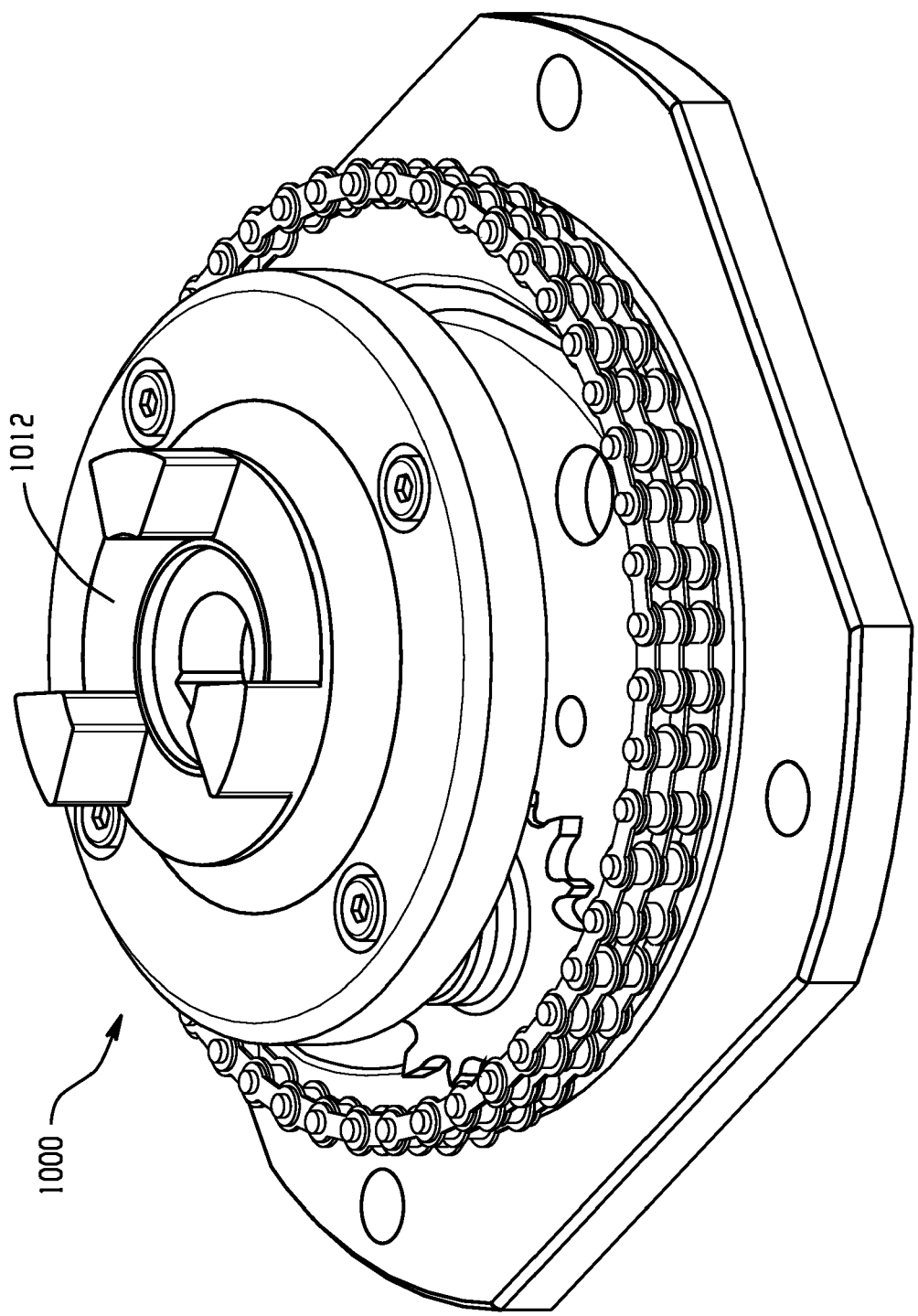
FIG. 10 is a perspective view of another embodiment of the present invention.

The present invention may also be practiced with other planetary gear sets. Embodiments 900 and 1000 incorporating a multiple-strand roller chain ring gear 901 are illustrated in FIGS. 9 and 10, respectively. Planetary gear set embodiment 900 provides a multiple-strand ring gear 901 wherein the first inner chain strand 902 is firmly fixed and supported to and by inner plate structure 914 through chain-engagement structures (not shown). The chain-engagement structures are well known in the art. One example includes a plurality of gear tooth structures arrayed about a radius defined with respect to a central axis C common with the motor input shaft (not shown in this view), and about which the first chain strand 902 is tightly reeved. The second outer chain strand 904 is thus supported in a cantilever fashion through a plurality of common chain pins 905, leaving the rollers of the second outer chain strand 904 free for unimpeded inner access by the planetary gears 906. The planetary gears 906 are rotatably affixed about planetary gear pins 908, and the gear pins 908 are mounted into the output disc 910. Thus, in a fashion similar to that described with regard to the single-strand planetary gear set embodiment 100 described above, speed transformation is accomplished through translation of force and speedy inputs from an input gear mounted directly on an input shaft (not shown in this view) as received by the planetary gears 906 and ultimately translated to the output element gear 912.

The multiple-strand planetary gear set embodiment 1000 illustrated in FIG. 10 is essentially and functionally similar to embodiment 900 shown in FIG. 9, except for the replacement of the output element gear 912 with a Lovejoy joint 1012, and it may be otherwise understood with respect to the description of embodiment 900 and the elements labeled in FIG. 9.

Figure 11:
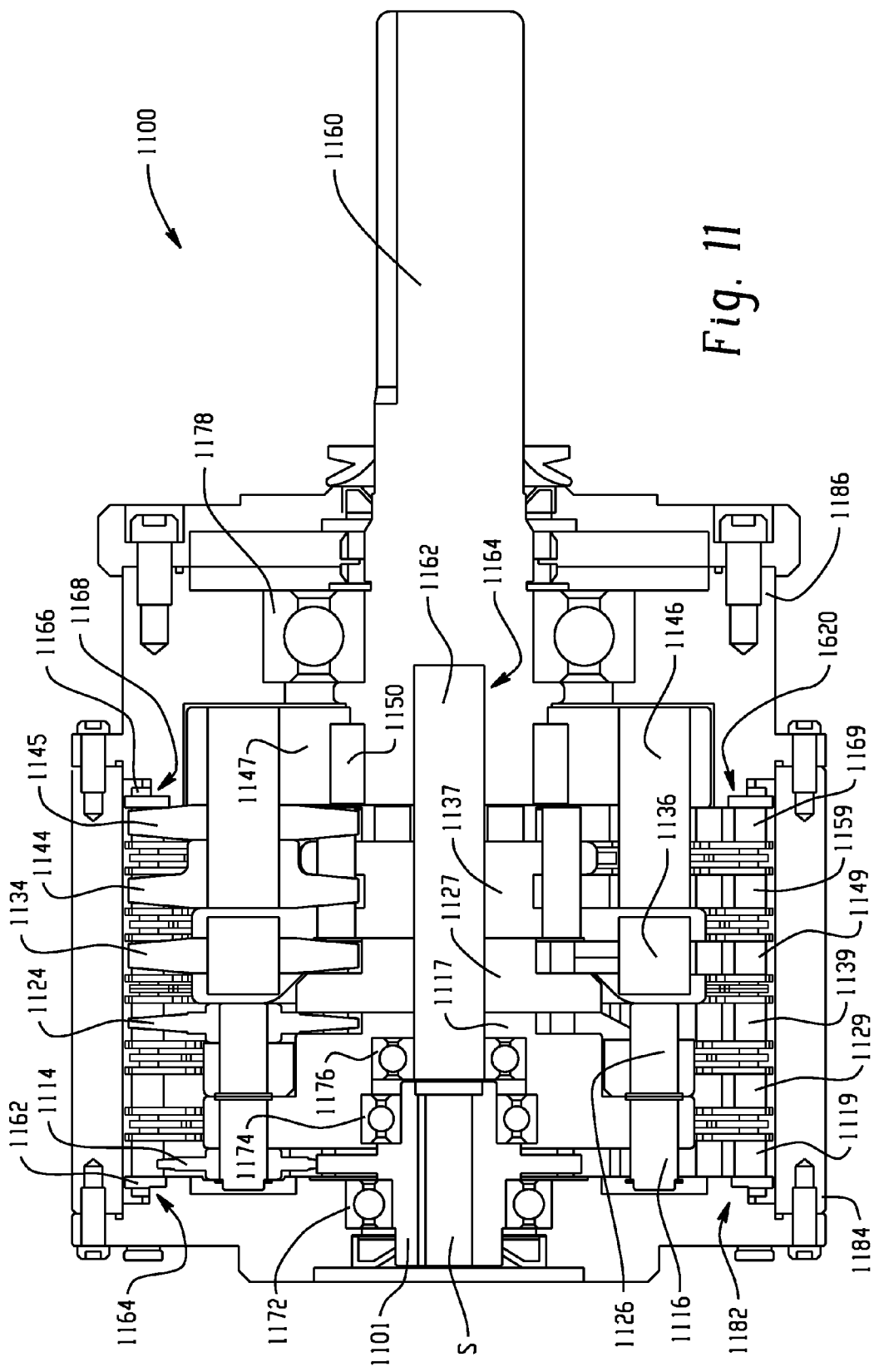
FIG. 11 is a perspective view of another embodiment of the present invention.

FIG. 11 illustrates a four-stage planetary gear set 1100 according to the present invention. A sun input driving gear 1101 attached to an input motor shaft S from a workpiece motor drives circumferentially spaced first stage planetary gears 1114, each first stage planetary gear 1114 responsively traveling about a first inner roller chain strand 1119 of a six-strand composite roller chain ring gear 1620 fixed between and connected to an outer housing assembly comprising input-side housing plate 1182, cylindrical outer housing cover 1184 and output-side housing plate 1186. The first stage planetary gears 1114 also rotate about respective first stage pins 1116 each fixed into an inner first stage disc body 1117 as they travel along the fixed inner roller chain strand 1119, thus driving the first stage pins 1116 and the first stage disc body 1117 connected thereto into rotation, the first stage disc body 1117 rotating with a reduced output torque and speed relative to the input shaft S.

As will be appreciated by one skilled in the art, each subsequent stage in the four-stage planetary gear set 1100 is configured to produce reduced output speed and torque relative to an input torque and speed of a previous input stage. In the present embodiment the rotating first stage disc body 1117 drives second stage planetary gears 1124 to travel along a third ring gear roller chain strand 1139 while rotating about second stage pins 1126 fixed into a second stage disc body 1127, driving the second stage disc body 1127 into rotation and thereby driving third stage planetary gears 1134. (In the present embodiment the second roller chain strand 1129 is not engaged by planetary gearing, in one aspect in order to provide operative advantages in optimizing space for configuration of the first stage pins 1116 and the second stage pins 1126, though it should be understood that other embodiments may provide for gearing engagement of the second roller chain strand 1129.

The driven third stage planetary gears 1134 thus responsively travel along a fourth ring gear roller chain strand 1149 while rotating about and driving third stage pins 1136 fixed into a third stage disc body 1137 into rotation, the third stage disc body 1137 responsively driving fourth stage planetary gears 1144 and 1145. The fourth stage planetary gears 1144 and 1145 are thus urged to travel along a fifth and sixth ring gear roller chain strands 1159 and 1169, respectively, while rotating about and driving common fourth stage pins 1146 and their associated fourth stage disc body 1147 into rotation. The fourth stage disc body 1147 is connected through a shear pin means 1150 to an output shaft 1160, which is thus rotated and has an output torque and speed reduced by each of the four stages relative to the input shaft S torque and speed.

In the present embodiment inner chain plates 1162 of the first inner roller chain strand 1119 are reeved tightly about and engaging chain-plate engagement regions 1164 formed on the input-side housing plate 1182, and outer chain plates 1166 of the sixth and outer-most roller chain strand 1169 are reeved tightly about and engaging chain-plate engagement regions 1168 formed on the output-side housing plate 1186. Further details and descriptions of the interaction of the engaged chain plates 1162,1166 with the respective chain-plate engagement regions 1164,1168 are provided by another commonly-owned and assigned US patent application filed by applicant with another inventor, namely U.S. Patent Application for COMPOUND GEARING SYSTEM AND METHOD WITH CHAIN AND BELT ENGAGEMENT STRUCTURES by Merritt A. Osborn and Theodore Radisek filed Aug. 12, 2005, Ser. No. 11/202,876, Confirmation No. 9280, which is hereby incorporated in its entirety by reference. Thus the outer housing assembly 1182,1184,1186 and multi-strand roller chain 1620 form a compound ring gear assembly providing roller chain elements configured to engage sprocket teeth of the planetary gears 1114,1124,1134, 1144,1145, respectively.

In one advantage of the present invention a total operative torque load of the four-stage reducer 1100 may be translated to and borne by the input shaft S through operation of high-speed input-shaft engaging bearings 1172, 1174. More particularly, an input-side housing support bearing 1172 is disposed between the inner housing plate 1182 and the sun-gear element 1101, and thus the shaft S supports and receives operative forces from the inner housing plate 1182 through the attached sun-gear element 1101. A first-stage support bearing 1174 is disposed between the first stage disc 1117 and the sun-gear element 1101, thus the shaft S also supports and receives operative forces from the first stage disc 1117 through the attached sun-gear element 1101.

A shaft bearing 1176 is disposed between the first stage disc 1117 and a central output shaft extension 1162, the shaft extension 1162 press-fit into and extending from the output shaft 1160. The central shaft extension 1162 also engages and supports the second stage disc body 1127 and the third stage disc body 1137 through a journal bearing means 1164 comprising a lubricated gap structure, the dimensions of the gap selected as a function of lubricant viscosity and material hardness, and will be known by one skilled in the art. Lastly, a low-speed output shaft bearing 1178 is provided between the output shaft 1160 and the outer housing plate 1186 to provide output shaft 1160 support functions. The shaft bearing 1176, shaft journal bearing 1164 and low-speed output shaft bearing 1178 function to maintain concentricity of the disc body elements 1117, 1127, 1137 and 1147 and the shaft extension 1162 and associated output shaft 1160 during speed reducing operations, the shaft bearing 1176 also transferring operative loads from the disc body elements 1117, 1127, 1137 and 1147 and the shaft extension 1162 to the first disc body 1117, which in turn translates those loads to the input shaft S through the first-stage support bearing 1174 and the sun gear element 1101.

Figure 12:
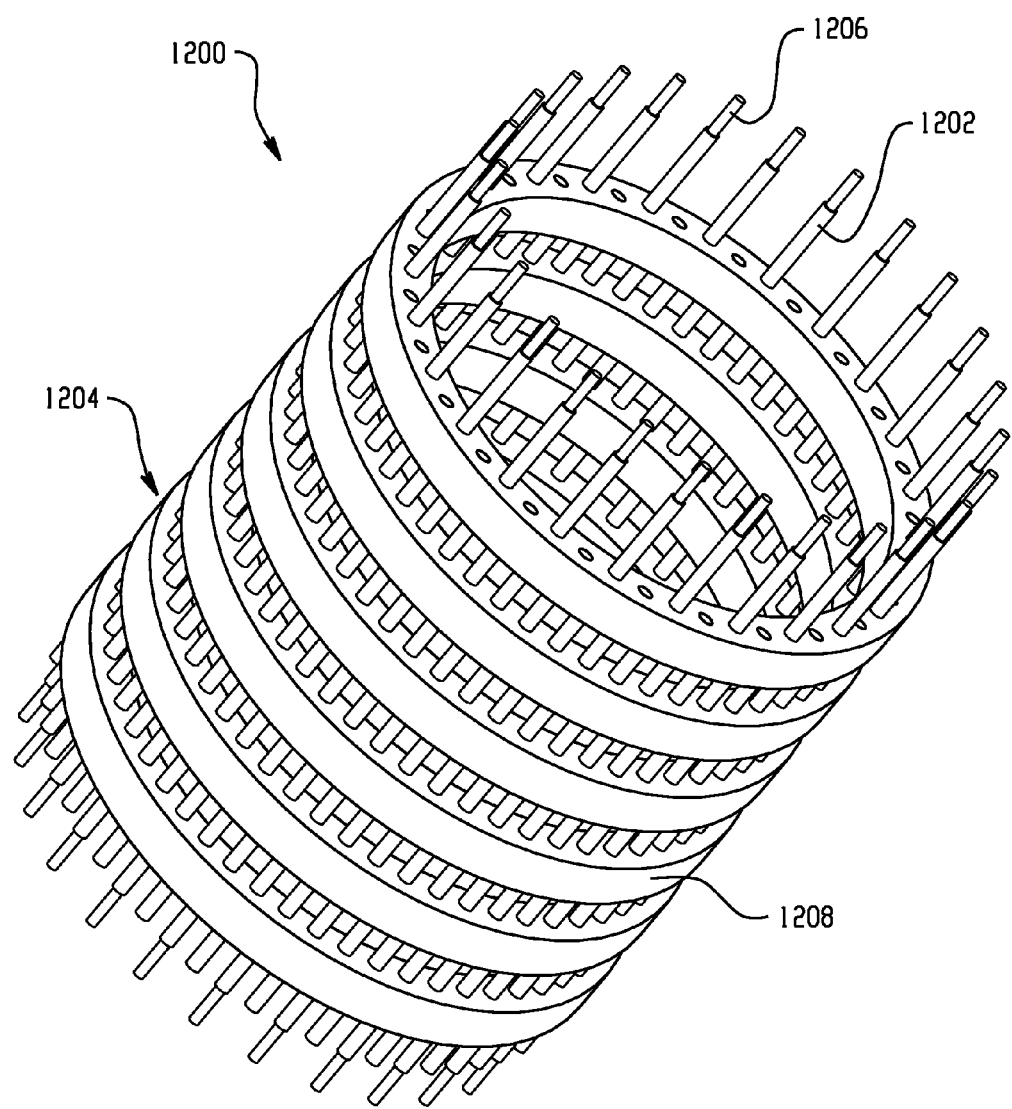
FIG. 12 is a perspective view of another embodiment of the present invention.

The use of roller chains 1119,1139,1149,1159,1169 provides operative advantages with respect to lubrication, for example in un-cased applications, as will be apparent to one skilled in the art. An alternative ring gear assembly 1200 illustrated in perspective in FIG. 12 may also provide advantages in some gearing applications, for example in high-speed multi-stage speed reducer applications. More particularly, the alternative ring gear assembly 1200 or similar structure may be used instead of the outer housing elements 1182,1184, 1186 and multi-strand roller chain 1620 assembly in the four-stage planetary gear set 1100 of FIG. 11. Thus roller pins 1202 arrayed in circular pluralities to form circular ring gear arrays 1204 may be configured to engage the sprocket teeth of planetary gears 1114, 1124, 1134, 1144, 1145, the pins 1202 fixed at each end 1206 into spacer ring elements 1208, and wherein the outermost array pin ends 1206 are fixed into either the output-side housing plate 1186 or the input-side housing plate 1182.

While several embodiments of this invention have been shown and described, various adaptations and modifications can be made without departing from the scope of the invention as defined in the appended claims.

What is claimed is:

1. A gear set, comprising:
   an input gear attached to an input motor shaft, the input gear comprising a plurality of gear teeth;
   a plurality of gear elements cooperatively engaging the input gear teeth and comprising an output element, the plurality of gear elements configured to translate a first motor shaft input gear revolution speed into a second output element output revolution speed and a first input torque into a second output element torque; and
   a bearing means disposed about the input motor shaft and configured to support the plurality of gear elements upon the motor shaft, the bearing means thereby transferring an operational load of the gear set to an input motor through the motor shaft, the operational load comprising a total operative torque load of the gear set;
   wherein the bearing means comprises inner and outer high-speed bearings; and the plurality of gears further comprises:
   an inner disc body defining a central aperture, the inner disc body aperture disposed about the inner high-speed bearing and the inner disc thereby supported by the input shaft through cooperative engagement with the inner high-speed bearing; and
   an outer disc body defining a central aperture and axially spaced relative to the input shaft from the inner disc body, the output element is affixed to the outer disc body, the outer disc body aperture disposed about the outer high-speed bearing and the outer disc body and output element thereby supported by the input shaft through cooperative engagement with the outer high-speed bearing.

2. The gear set of claim 1, wherein the plurality of gear elements comprises:
   a plurality of planetary gear pins each having inner and outer ends, the plurality of planetary gear pins circumferentially spaced about the input gear and disposed between the inner and outer disc bodies, each of the pin inner ends fixed into the inner disc body and each of the pin outer ends fixed into the outer disc body;
   a plurality of planetary gears each rotatably disposed about one of the gear pins and configured to engage the input gear; and
   a ring gear affixed to an input motor housing and disposed about the plurality of planetary gears, the ring gear configured to engage the plurality of planetary gears;
   wherein the output element is disposed about the input shaft and configured to freely rotate about the input shaft, the output element affixed to at least one of the outer pin end plurality and the outer disc.

3. The gear set of claim 2, wherein the gear set is generally cylindrical with respect to the input motor shaft, the gear set having a width dimension of about 1.06 inches and an outer radius dimension of about a 6.6 inches; and
   the input motor shaft has an outside diameter of about ⅝ inch and an input shaft length of about 2 and 1/16 inches, the input motor shaft further defining a keyway dimension of about 3/16 inch.

4. The gear set of claim 2, further comprising:
   a second stage plurality of gear elements cooperatively engaging the output element, the plurality of gear elements configured to translate the second output element output revolution speed and the second output element torque into a second stage output revolution speed and a second stage output torque; and
   a second stage bearing means disposed about the input motor shaft and configured to support the second stage plurality of gear elements upon the motor shaft, the second stage bearing means thereby transferring an operational load of the second stage plurality of gear elements to the input motor through the motor shaft;
   wherein the second stage plurality of gear elements is configured to generate the second stage output revolution speed and the second stage output torque through a second stage output element.

5. The gear set of claim 2, wherein the output element further comprises an output aperture defined about the input shaft; and
   further comprising an output element bearing means disposed within the aperture, wherein the output element is supported by the output element bearing means and the inner and outer high-speed bearings.

6. The gear set of claim 2, further comprising:
an output element shaft extension, the shaft extension defining an inner shaft cylindrical aperture disposed to freely rotate about the input shaft;
a support bracket arm attached to the motor housing and defining a bracket aperture disposed about the output element shaft extension; and
a shaft support bearing means disposed within the bracket arm aperture and rotatably connecting the output element shaft extension to the support bracket, wherein the output element is supported by the shaft support bearing means and the inner and outer high-speed bearings.

7. The gear set of claim 1, wherein the plurality of gear elements comprises:
an inner harmonic gear connected to the inner disc body;
an outer harmonic gear connected to the outer disc body and arrayed axially parallel and eccentrically to the inner harmonic gear; and
a ring gear disposed about and configured to engage the inner and outer harmonic gears.

8. The gear set of claim 7, wherein the output element further comprises an output aperture defined about the input shaft; and
further comprising an output element bearing means disposed within the aperture, wherein the output element is supported by the output element bearing means and the inner and outer high-speed bearings.

9. The gear set of claim 7, further comprising:
an output element shaft extension, the shaft extension defining an inner shaft cylindrical aperture disposed to freely rotate about the input shaft;
a support bracket arm attached to the motor housing and defining a bracket aperture disposed about the output element shaft extension; and
a shaft support bearing means disposed within the bracket arm aperture and rotatably connecting the output element shaft extension to the support bracket, wherein the output element is supported by the shaft support bearing means and the inner and outer high-speed bearings.

10. A method for speed transformation, comprising:
attaching an input gear to an input motor shaft;
disposing an inner high-speed bearing and an outer high-speed bearing about the input shaft;
disposing a plurality of gears upon the inner high-speed bearing and the outer high-speed bearing about the input shaft, the plurality of gears having an output element disposed rotatably about the input shaft;
the input shaft supporting a plurality of gears inner disc body disposed about the inner high-speed bearing through the inner high-speed bearing;
the input shaft supporting a plurality of gears outer disc body disposed about the outer high-speed bearing and axially spaced relative to the input shaft from the inner disc body through cooperative engagement with the outer high-speed bearing;
connecting the output element to the outer disc body;
rotating the input motor shaft and attached input gear at a first input motor shaft revolution speed with a first torque;
the input gear teeth engaging and turning the plurality of gears;
the plurality of gears rotating the output element at a second output element revolution speed with a second output torque; and
the inner high-speed bearing and the outer high-speed bearing transferring an operational load of the plurality of gears to an input motor through the input motor shaft, the operational load comprising a total operative torque load of the gear set.

11. The method of claim 10, further comprising the steps of:
circumferentially spacing a plurality of planetary gear pins about the input gear between the inner and outer disc bodies, each of the pin inner ends fixed into the inner disc body and each of the pin outer ends fixed into the outer disc body;
rotatably disposing each of a plurality of planetary gears about one of the planetary gear pins, the planetary gears engaging the input gear;
disposing a ring gear affixed to an input motor housing about the plurality of planetary gears, the ring gear engaging the plurality of planetary gears; and
the output element rotating at the second output element revolution speed with the second output torque through cooperative engagement with at least one of the outer pin end plurality and the outer disc.

12. The method of claim 11 further comprising the steps of:
disposing a second stage bearing means about the input motor shaft;
disposing a second stage plurality of gear elements about the second stage bearing means, the second stage bearing means thereby transferring an operational load of the second stage plurality of gear elements to the input motor through the motor shaft;
the second stage plurality of gear elements engaging the output element, and
the second stage plurality of gear elements generating a second stage output revolution speed and a second stage output torque through a second stage output element.

13. The method of claim 11, further comprising the steps of:
the output element defining an aperture about the input shaft;
disposing an output element bearing means within the aperture about the input shaft; and
the output element bearing means and the inner and outer high-speed bearings supporting the output element upon the input shaft.

14. The method of claim 11, further comprising the steps of:
providing an output element shaft extension;
the shaft extension defining an inner shaft cylindrical aperture disposed to freely rotate about the input shaft;
attaching a support bracket arm to the motor housing;
the support bracket arm defining a bracket aperture disposed about the output element shaft extension;
disposing a shaft support bearing means within the bracket aperture, the shaft support bearing means rotatably connecting the output element shaft extension to the support bracket; and
the shaft support bearing means and the inner and outer high-speed bearings supporting the output element.

15. The method of claim 10, further comprising the steps of:
connecting a plurality of gear elements inner harmonic gear to the inner disc body;
connecting a plurality of gear elements outer harmonic gear to the outer disc body arrayed axially parallel and eccentrically to the inner harmonic gear;

disposing a plurality of gear elements ring gear about the inner and outer harmonic gears, the ring gear engaging the inner and outer harmonic gears.

16. The method of claim 15, further comprising the steps of:
   the output element defining an aperture about the input shaft;
   disposing an output element bearing means within the aperture about the input shaft; and
   the output element bearing means and the inner and outer high-speed bearings supporting the output element upon the input shaft.

17. The method of claim 15, further comprising the steps of:
   providing an output element shaft extension;
   the shaft extension defining an inner shaft cylindrical aperture disposed to freely rotate about the input shaft;
   attaching a support bracket arm to the motor housing;
   the support bracket arm defining a bracket aperture disposed about the output element shaft extension;
   disposing a shaft support bearing means within the bracket aperture, the shaft support bearing means rotatably connecting the output element shaft extension to the support bracket; and
   the shaft support bearing means and the inner and outer high-speed bearings supporting the output element.

18. The method of claim 15 further comprising the steps of:
   disposing a second stage bearing means about the input motor shaft;
   disposing a second stage plurality of gear elements about the second stage bearing means, the second stage bearing means thereby transferring an operational load of the second stage plurality of gear elements to the input motor through the motor shaft;
   the second stage plurality of gear elements engaging the output element, and
   the second stage plurality of gear elements generating a second stage output revolution speed and a second stage output torque through a second stage output element.

* * * * *